United States Patent [19]

Niederdellmann et al.

[11] 4,282,367

[45] Aug. 4, 1981

[54] PROCESS FOR THE SEPARATION OF POLYURETHANE FOAM HYDROLYSATES INTO POLYOL AND DIAMINE

[75] Inventors: Georg Niederdellmann, Dormagen; Norbert Roemer, Monchen-Gladbach; Ernst Grigat, Odenthal, all of Fed. Rep. of Germany

[73] Assignee: Bayer Aktiengesellschaft, Leverkusen, Fed. Rep. of Germany

[21] Appl. No.: 105,059

[22] Filed: Dec. 19, 1979

[30] Foreign Application Priority Data

Dec. 20, 1978 [DE] Fed. Rep. of Germany ....... 2854940

[51] Int. Cl.$^3$ ...................... C08G 18/48; C08G 18/14
[52] U.S. Cl. .................................... 260/2.3; 521/174; 521/914; 568/621
[58] Field of Search ......................... 260/2.3; 568/621

[56] References Cited

U.S. PATENT DOCUMENTS 4,035,314   7/1977   Lohr et al. ........................... 260/2.3

Primary Examiner—H. S. Cockeram
Attorney, Agent, or Firm—Gene Harsh; Joseph C. Gil

[57] ABSTRACT

The instant invention is directed to a process for the separation of polyurethane hydrolysates into polyamines and polyols which can be used again for the production of polyurethanes, comprising introducing gaseous hydrogen chloride into the hydrolysate mixture which has optionally been diluted with an inert solvent, and removing the precipitated amine salt by filtration, characterized in that (a) gaseous hydrogen chloride is optionally first introduced into the hydrolysate in a quantity of from 0.02 to 0.07 mol per amine equivalent, the reaction mixture is filtered and the filter residue is discarded, then (b) from 0.20 to 0.47 mol of gaseous hydrogen chloride per mol of amine equivalents still present is introduced into the filtrate and the precipitated amine salt is filtered off, then (c) stage (b) is repeated one or more times until the amine group content in the filtrate is below 1% by weight, based on the solvent-free filtrate, and finally (d) precipitation of the amine is completed by the introduction of from 0.5 to 1.0 mol of gaseous hydrogen chloride, based on the amine equivalents remaining in the filtrate.

2 Claims, No Drawings

PROCESS FOR THE SEPARATION OF POLYURETHANE FOAM HYDROLYSATES INTO POLYOL AND DIAMINE

BACKGROUND OF THE INVENTION

Numerous processes are known for decomposing polyurethane foam waste by hydrolytic degradation into a mixture of the polyol used as a starting material and the diamine from which the diisocyanate used for the production of the foam was obtained (see e.g., German Offenlegungsschrift No. 24 42 387). Before this hydrolysate mixture is used again in a production process, it must be separated into the polyol and the diamine component.

A separation process, if it is to be commercially useful, should operate economically, should not require high investment costs and should deliver the isolated raw materials in a form in which they can, as far as possible, be used directly, i.e. without elaborate purification. In the case of the rather delicate compositions for polyurethane soft foams, which are very sensitive to any interfering influences such as impurities, this applies particularly to the quality of the polyether polyols which are recovered from the hydrolysates to be used again in the foaming process.

Separation of the hydrolysate mixture has hitherto been carried out mainly by distillation and liquid extraction processes in various modifications. The diamine component is recovered in a high yield and in a high degree of purity from the distillation process but the polyether obtained as the distillation residue is unsuitable for direct reuse in foaming in the form in which it is obtained (Environmental Science and Technology, Volume 8, No. 2, February 1974, page 138).

In the liquid extraction process as described, for example, in German Auslegeschrift No. 2,207,379, the hydrolysate is taken up in toluene or some other organic solvent and the diamine is extracted using dilute aqueous hydrochloric acid. The limited solubility of the diamine hydrochloride necessitates the use of a considerable volume of dilute acid, which must subsequently be removed from the extract by distillation. Moreover, the stabilizers and emulsifiers which were used in the production of the foam make separation of the organic and aqueous phases very difficult.

U.S. Pat. No. 4,035,314 describes the recovery of polyurethane raw materials by the hydrolysis of plastic materials obtained from automobile scrap. In this process, when the polyurethane hydrolysate which consists mainly of polyether and diamine has been separated from the unhydrolysable synthetic materials by means of an organic solvent, gaseous hydrogen chloride is introduced into the solution of hydrolysate until no more amine hydrochloride precipitates. After removal of the amine hydrochloride by filtration and removal of the solvent and excess hydrogen chloride by distillation, a regenerated polyether is obtained. This is reacted with tolylene diisocyanate to form a prepolymer which, when mixed with pure prepolymer, can be hardened with 4,4'-methylene dianiline to produce an elastomer. Regenerated polyethers used in this way are, however, unusable for the production of foams because they contain large residues of amines even when a clear excess of hydrogen chloride has been used.

It has now surprisingly been found that a regenerated polyether which is virtually free from amine and which can be foamed satisfactorily is obtainable by fractionating the precipitation of amine hydrochloride, i.e. by carrying it out in several stages, and separating the precipitated amine salt from the solution of hydrolysate at each stage before a fresh supply of hydrogen chloride is introduced.

DESCRIPTION OF THE INVENTION

This invention thus relates to a process for the separation of polyurethane hydrolysates into polyamines and polyols which can be used again for the production of polyurethanes, in particular polyurethane foams, by the introduction of gaseous hydrogen chloride into the hydrolysate mixture, which is optionally diluted with inert solvents, and filtering off the precipitated amine salt, characterized in that (a) hydrogen chloride is optionally first introduced into the hydrolysate in a quantity of from 0.02 to 0.07 mol, preferably about 0.05 mol per amine equivalent, the reaction mixture is filtered and the filter residue is discarded, then (b) hydrogen chloride is introduced into the filtrate in a quantity of from 0.20 to 0.47 mol, preferably from 0.30 to 0.45 mol for each amine equivalent still present, and the precipitated amine salt is filtered off, then (c) stage (b) is repeated one or more times until the amine group content in the filtrate is below 1% by weight (based on the solvent-free filtrate), preferably below 0.5% by weight, most preferably below 0.25% by weight, and finally (d) precipitation of the amine is completed by the introduction of from 0.5 to 1.0 mol of hydrogen chloride, based on the equivalents of amine left in the filtrate.

The amine content of the hydrolysate or of the filtrates may be determined by any desired method, e.g. by titration. Step (a) of the process is especially recommended for hydrolysates which are contaminated with fillers such as pigments. These impurities are removed together with the small quantity of diamino monohydrochloride precipitated.

The amine content in the filtrate is generally already below 1% by weight (based on the solvent-free filtrate) after the second precipitation stage according to the present invention, and has preferably fallen below 0.5% by weight. If, however, gaseous hydrogen chloride is introduced in a quantity at the lower end of the range required (about 2.0 mol per amine equivalent), it may be necessary to carry out more than two precipitations.

The hydrogen chloride may, in principle, be passed directly into the crude hydrolysate but it is preferable first to dilute the hydrolysate with approximately its own weight of an inert organic solvent such as petroleum ether, cyclohexane, methylene chloride, benzene, toluene, xylene, chlorobenzene, or the like. Toluene is a particularly suitable diluent. Virtually any operating temperature from room temperature to the boiling point of the diluent may be used, but a temperature in the range of from 70° to 90° C. is particularly preferred because the precipitated amine salt is then most easily filtered.

The process according to the present invention is suitable for working up hydrolysates of any polyurethane waste materials, but hydrolysates of commercial polyether urethane foams produced by any known process (from polyisocyanates, polyether polyols, blowing agents, catalysts and optionally other additives) are preferred. The hydrolysates are obtained from the polyurethane material using a known method by the action of hot water or steam, preferably under pressure. A continuously operating screw extruder of the type described, for example, in German Offenlegungsschrift No. 2,442,387 (U.S. Pat. No. 4,051,212) is preferably used for this purpose.

The regenerated polyols obtained according to the present invention may be used again directly, without any further purification, for the production of polyurethanes, in particular polyether urethane soft foams with the usual, well-known starting materials. The polyamines may be liberated from the amine salt using a known method by treatment with strong bases (e.g. calcium hydroxide) and may, for example, be rephosgenated to polyisocyanates.

The following examples serve to explain the process in more detail. Quantities given are to be understood as parts by weight or percentages by weight unless otherwise indicated. The examples are based on hydrolysates obtained according to German Offenlegungsschrift No. 2,442,387 or U.S. Pat. No. 4,051,212 from commercial block soft foams produced on the basis of tolylene diisocyanate and a polyether polyol having an average molecular weight of 3,200 which has been obtained by the chemical addition of ethylene oxide/propylene oxide (10:90) to a mixture of trimethylol propane and propylene glycol (85:15), using the following formulation:

100.0 parts of polyether polyol
36.3 parts of T 80 (tolylene diisocyanate containing 80% 2,4- and 20% 2,6-isomers)
2.7 parts by water
0.6 parts of a polyether siloxane (stabilizer OS 25 of Bayer AG)
0.06 parts of permethylated N-2-aminoethyl piperazine
0.18 parts of Sn-octoate
0.04 parts of dimethylamino ethanol.

EXAMPLES 1 a–c (Comparison Experiments)

400 parts of toluene were added in each case to 400 parts of the crude hydrolysate which had an amine content of 5.2% by weight NH$_2$ (determined by a perchloric acid titration), and the mixture was dehydrated by heating for 30 minutes in an azeotropic separator. Gaseous hydrogen chloride was then introduced (a) at room temperature (b) at 50° C. and (c) at 80° C. until precipitation of the amine salt was completed. Precipitate (a) was very finely dispersed and could not be filtered, precipitate (b) was moderately dispersed and required long filtering times and precipitate (c) was substantially a coarsely crystalline substance with only a small portion of finely dispersed precipitate formed towards the end of precipitation, and it could easily be filtered. Filter cake (c) was washed using a small quantity of anhydrous toluene. The purified filtrates were then freed from toluene and excess hydrogen chloride in a vacuum evaporator.

129 parts of crude amine salt (theoretical quantity of dihydrochloride: 129.9 parts; theoretical quantity of monohydrochloride: 105.6 parts) and 291 parts of polyether (theoretical quantity: 318.7 parts) were isolated from experimental batch (1c). Since the polyether had a very high acid number of 2.24, it was subsequently treated with solid soda and then provided the following analytical data:

hydroxyl number: 50.9
acid number: 0.14
H$_2$O: 0.07%
NH$_2$: 0.49%
pH: 9.2

EXAMPLE 2 (Comparison Experiment)

100.0 parts of regenerated polyether from Example (1c)
100.0 parts of pure polyether used as a starting material
6.0 parts of water
2.0 parts of stabilizer OS 25
0.3 parts of permethylated N-2-aminoethyl piperazine
0.2 parts of dimethyl amino ethanol
0.4 parts of Sn-octoate and
79.0 parts of T 80 were mixed using a high speed stirrer and poured out after a stirring time of 7 seconds into a cardboard mold measuring 20×20 cm. A very irregular foam was obtained, which "imploded" at certain points even while still rising and completely collapsed after a rise time of 98 seconds.

EXAMPLE 3 (Comparison Experiment)

The procedure was analogous to that of Example (1c), but the introduction of gaseous hydrogen chloride was controlled so that a calculated quantity of 35.6 parts was introduced (150 equivalent percent based on monohydrochloride or 75 equivalent percent based on dihydrochloride). The introduction of hydrochloride was carried out in a closed stirrer vessel under such conditions that the internal pressure, controlled by a manometer never rose above 1.0 excess atmospheres. The reaction mixture was then stirred until there was no more excess pressure and the gaseous hydrogen chloride had been completely adsorbed. The product was worked up as described in Example (1c) and yielded 112 parts of crude amine salt and 303 parts of polyether which, after treatment with solid soda, provided the following analytical data:

hydroxyl number: 49.5
acid number: 0.11 (without soda treatment: 1.40)
H$_2$O: 0.06%
NH$_2$: 0.33%
pH: 9.5

When the regenerated polyether was foamed up as described in Example 2, a completely unusable foam having an irregular pore structure, high shrinkage and severe tearing was obtained.

EXAMPLE 4

(Process according to the present invention)

In a first stage, 19.0 parts of gaseous hydrogen chloride (80 equivalents %, based on the monohydrochloride) were introduced under controlled conditions at 80° C. into the anhydrous mixture of Example 1 of 400 parts of crude hydrolysate which had an amine content determined by titration of 5.2% and 400 parts of toluene. In a second stage, 4.75 parts of gaseous hydrogen chloride (90 equivalents %, based on the monohydrochloride) were introduced, again at 80° C., into the solution which still had an amine content of 0.58% after removal of the amine salt. In a third stage, after renewed removal of the amine salt, precipitation was completed by the introduction of 1.1 parts of gaseous hydrogen chloride (150 equivalents % based on the monohydrochloride) into the solution which now still contained 0.08% NH$_2$. The amine salt portions which were filtered off were freed from polyether adhering to them by washing with anhydrous toluene. The combined solutions in toluene treated in the vacuum evaporator yielded 315.4 parts of polyether which had the following analytical data:
  hydroxyl number: 48.5
  acid number: 0.02 (without soda treatment: 0.7)
  $H_2O$: 0.1%
  $NH_2$: 0.05%
  pH: 8.2 (without soda treatment: 5.0)

In addition, a total of 99 parts of amine salt was obtained.

EXAMPLE 5

100 parts of the regenerated polyether and 100 parts of original polyether were used for the production of a foam in accordance with the formulation given in Example 2. The reaction mixture was mixed using a high speed stirrer and poured out into a cardboard mold measuring 20×20 cm. An excellent foam having a uniform cell structure was obtained. Compared with an original foam of pure starting polyether, it had the following properties:

|  | Original Foam | Regenerated Foam |
| --- | --- | --- |
| Cream time (sec) | 9 | 7 |
| Rise time (sec) | 86 | 83 |
| Gel time (sec) | 28 | 91 |
| Permeability to air (mm water column) | 150 | 220 |
| Gross density (kg/m$^3$) according to DIN 53420 | 27 | 27 |
| Tensile strength (KPa) according to DIN 53571 | 110 | 85 |
| Elongation at break (%) according to DIN 53571 | 190 | 135 |
| Compression resistance at 40% Compression (KPa) according to DIN 53577 | 4.1 | 3.9 |

EXAMPLE 6

50 parts of crude amine salt from Example 4 and 15 parts of commercial calcium hydroxide were intimately mixed together and roasted in a vacuum of from 2 to 4 Torr and at a reaction temperature which gradually rose from 140° C. to 265° C. When the elimination of water was completed, 32 parts of tolylene diamine (83.1% of the theoretical yield, based on monohydrochloride) distilled off at a head temperature of from 133° to 137° C. When analyzed using gas chromatography it was found to be an isomeric mixture of 19% 2,6- and 81% 2,4-tolylene diamine, and it could be directly phosgenated to tolylene diisocyanate in a smooth reaction without further purification.

What is claimed is:

1. A process for the separation of propylene oxide/ethylene oxide-based polyether polyurethane hydrolysates into polyamines and polyols which can be used again for the production of polyurethanes, comprising introducing gaseous hydrogen chloride into the hydrolysate mixture which has optionally been diluted with an inert solvent, and removing the precipitated amine salt by filtration, characterized in that:

(A) gaseous hydrogen chloride is optionally first introduced into the hydrolysate in a quantity of from 0.02 to 0.07 mol per amine equivalent, the reaction mixture is filtered and the filter residue is discarded, then (B) from 0.20 to 0.47 mol of gaseous hydrogen chloride, per mol of amine equivalents still present is introduced into the filtrate and the precipitated amine salt is filtered off, then (C) stage (B) is repeated one or more times until the amine group content in the filtrate is below 0.25% by weight, based on the solvent-free filtrate, and finally (D) precipitation of the amine is completed by the introduction of from 0.5 to 1.0 mol of gaseous hydrogen chloride based on the amine equivalents remaining in the filtrates.

2. The process of claim 1, wherein the temperature is in the range of from 70° to 90° C.

* * * * *